United States Patent
Plantan et al.

(10) Patent No.: US 7,175,006 B2
(45) Date of Patent: Feb. 13, 2007

(54) APPARATUS AND METHOD FOR SENSING DISC BRAKE ACTUATOR POSITION

(75) Inventors: Ronald S. Plantan, Westlake, OH (US); Richard B. Jacobs, Avon Lake, OH (US); Anton Schneider, Avon, OH (US); Ronald D. Bailey, Elyria, OH (US); Robert J. Nechvatal, Columbia Station, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 10/847,478

(22) Filed: May 18, 2004
(Under 37 CFR 1.47)

(65) Prior Publication Data

US 2005/0258006 A1    Nov. 24, 2005

(51) Int. Cl.
*F16D 65/56* (2006.01)
(52) U.S. Cl. .................. 188/72.9; 188/1.11 W
(58) Field of Classification Search ........... 188/1.11 R, 188/1.11 W, 1.11 L, 1.11 E, 196 R, 71.8, 188/71.9, 72.7, 72.9, 72.6, 71.7; 92/5 L, 92/5 R
See application file for complete search history.

(56) References Cited

U.S. PATENT DOCUMENTS

| | | | | |
|---|---|---|---|---|
| 2,886,140 A | * | 5/1959 | Trevaskis | 188/71.8 |
| 3,018,852 A | * | 1/1962 | Stanton | 188/72.3 |
| 3,782,513 A | * | 1/1974 | Birge | 188/206 R |
| 3,887,040 A | * | 6/1975 | Simon et al. | 188/1.11 R |
| 3,983,964 A | * | 10/1976 | Beals et al. | 188/1.11 R |
| 4,280,594 A | * | 7/1981 | Baum | 188/1.11 W |
| 4,356,897 A | * | 11/1982 | Urban | 188/1.11 W |
| 4,742,326 A | * | 5/1988 | Gregoire et al. | 340/453 |
| 4,850,454 A | * | 7/1989 | Korody | 188/1.11 L |
| 5,035,303 A | * | 7/1991 | Sullivan | 188/1.11 W |
| 5,285,190 A | * | 2/1994 | Humphreys et al. | 340/453 |
| 5,501,305 A | * | 3/1996 | Stalmeir et al. | 188/167 |
| 5,511,636 A | * | 4/1996 | Tanaka | 188/1.11 W |
| 5,535,854 A | * | 7/1996 | Prince | 188/1.11 R |
| 5,632,359 A | * | 5/1997 | Camps et al. | 188/1.11 R |
| 5,697,472 A | * | 12/1997 | Walker et al. | 188/1.11 W |
| 5,848,673 A | * | 12/1998 | Strauss et al. | 188/1.11 L |

(Continued)

FOREIGN PATENT DOCUMENTS

DE            2734786       *  2/1979

(Continued)

*Primary Examiner*—Christopher P. Schwartz
(74) *Attorney, Agent, or Firm*—Crowell & Moring LLP

(57) ABSTRACT

For an air-operated disc brake there is provided an internal brake actuator stroke indicator which provides an indication, readily ascertained from outside the brake caliper, of the amount of actuator stroke remaining in a disc brake apparatus before a remaining available actuator stroke limit is reached. In one embodiment, the stroke indicator is a mechanical device, readable through a sight glass in a caliper port, coupled to the brake actuator in a manner which results in rotary motion of the indicator when the brake actuator is displaced through its stroke. Alternatively, the indicator may be a rotary sensor such as an electrical potentiometer coupled to the actuator, where the potentiometer sends an electrical signal indicative of the actuator stroke to an external display, such as a remote actuator stroke display at a vehicle operator's position.

30 Claims, 2 Drawing Sheets

U.S. PATENT DOCUMENTS

| | | | |
|---|---|---|---|
| 5,931,266 A * | 8/1999 | Harrup | 188/1.11 W |
| 5,967,266 A * | 10/1999 | Carnegie | 188/1.11 L |
| 6,112,859 A * | 9/2000 | Shuck et al. | 188/1.11 L |
| 6,129,183 A * | 10/2000 | Ward | 188/1.11 L |
| 6,135,242 A * | 10/2000 | Hockley | 188/1.11 R |
| 6,206,149 B1 * | 3/2001 | Heidenreich et al. | 188/171 |
| 6,250,434 B1 * | 6/2001 | Baumgartner et al. | 188/71.7 |
| 6,272,914 B1 * | 8/2001 | Ciotti | 188/11 |
| 6,352,137 B1 * | 3/2002 | Stegall et al. | 188/1.11 L |
| 6,460,659 B1 * | 10/2002 | Schaffer et al. | 188/1.11 W |
| 6,501,375 B1 * | 12/2002 | Weant et al. | 340/479 |
| 6,581,728 B2 * | 6/2003 | Borugian | 188/1.11 E |
| 6,637,262 B2 * | 10/2003 | Chang et al. | 188/11 |
| 6,753,771 B2 * | 6/2004 | Lesesky | 340/479 |
| 6,820,730 B2 * | 11/2004 | Angerfors | 188/71.9 |
| 6,847,869 B2 * | 1/2005 | Dewberry et al. | 701/29 |
| 6,891,468 B2 * | 5/2005 | Koenigsberg et al. | 340/453 |
| 2003/0121732 A1 * | 7/2003 | Miller | 188/1.11 W |
| 2004/0075450 A1 * | 4/2004 | Buge et al. | 324/710 |
| 2004/0206584 A1 * | 10/2004 | Bihn | 188/1.11 L |
| 2004/0238292 A1 * | 12/2004 | Ortegren et al. | 188/71.1 |
| 2005/0014393 A1 * | 1/2005 | Cortinovis | 439/34 |
| 2005/0039988 A1 * | 2/2005 | Philpott | 188/1.11 R |

FOREIGN PATENT DOCUMENTS

| | | | |
|---|---|---|---|
| DE | 4212407 | * | 10/1993 |
| DE | 4230675 | * | 3/1994 |
| EP | 093657 | * | 11/1983 |
| EP | 566006 | * | 10/1993 |

* cited by examiner

APPARATUS AND METHOD FOR SENSING DISC BRAKE ACTUATOR POSITION

BACKGROUND AND SUMMARY OF THE INVENTION

The present invention relates to disc brakes for vehicles, and in particular to air-operated disc brakes for commercial vehicles with an internal actuator which is displaced to apply the brake. Specifically, the present invention is directed to an apparatus and method for quick, reliable indication of the amount of stroke of an internal actuator of an air disc brake.

Pneumatically-operated disc brakes have been undergoing development and deployment on commercial vehicles since at least the 1970's, and are beginning to replace drum-style brakes due to advantages in areas such as cooling, fade resistance and serviceability. German patent publication DE 40 32886 A1, and in particular FIG. 1 of this document, discloses an example of such an air disc brake mechanism. In this design, a pneumatic diaphragm chamber 12 is attached to a rear face of the disc brake caliper housing 3, and applies a brake actuation force through a linear actuator rod 10 to a brake actuator lever 9 within the caliper. The brake's actuator lever in turn transfers and multiplies, via an eccentric, the force applied by the actuator rod to one or more spindles 14 which force brake pads 20 against a brake disc 1.

Notwithstanding the advantages of air-operated disc brakes, a disadvantage of brakes with internal actuator levers contained within a caliper housing and/or attached pneumatic housing is the lack of convenient means to assess the amount of remaining brake capacity, and specifically, to assess whether there remains a sufficient amount of actuator lever stroke (travel) in order to permit full application of the brake. This is particularly a problem where rapid assessment of brake condition is desired, such as during a pre-journey inspection or at a government safety inspection station.

Providing a reliable and convenient indication of internal actuator stroke is hampered by brake design constraints, such as a general lack of available space in the axle/wheel/brake envelope for external mounting of internal actuator stroke sensing devices, and the undesired exposure of equipment extending outward from the brake caliper, which subjects such equipment to harsh environmental conditions and potential physical damage from, for example, road debris. Accordingly, determining whether the brake actuator has sufficient stroke left to provide adequate braking force requires extensive, time-consuming vehicle and/or brake disassembly, typically including wheel removal to permit access to the brake caliper for inspection. This lack of a convenient actuator stroke indicator and resulting maintenance and inspection burden is a factor in the wide-spread market adoption of pneumatically-operated disc brake technology. Thus, at least for cost and vehicle safety requirement compliance reasons, it would be highly desirable to be able to have an easily accessed, reliable external indication of an air disc brake's remaining actuator stoke.

In view of the foregoing, it is an object of the present invention to provide a disc brake actuator stroke indicator and method to permit rapid, convenient actuator stroke determination without significant brake disassembly. This and other objects of the invention are achieved by the placement of an actuator stroke indicator coupled to the actuator assembly in an access port of the disc brake caliper housing, where the port is small enough to avoid compromising caliper housing integrity. The actuator stroke indicator may be, for example, a simple mechanical indicator readable immediately outside the caliper housing, or an electrical sensor, such as a potentiometer, coupled to a remotely-readable actuator stroke indicator display. A further embodiment of an electrical sensor arrangement would place the remotely-readable actuator stroke indicator display at a vehicle operator's position to permit operator monitoring of actuator stroke without leaving the operator's compartment.

The present invention's approach to providing actuator stroke indication has the advantages of avoiding compromise of caliper housing structural integrity by avoiding the need for large viewing access holes, providing easily accessible and reliable stroke indication, providing an indicator that is well within the available brake/wheel/hub space envelope, and providing a stroke indicator that is well shielded from adverse environmental conditions and physical damage from road debris. In addition, remote display of actuator stroke would permit a vehicle operator to monitor actuator stroke or receive actuator stroke limit warnings directly at the operator's position in the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
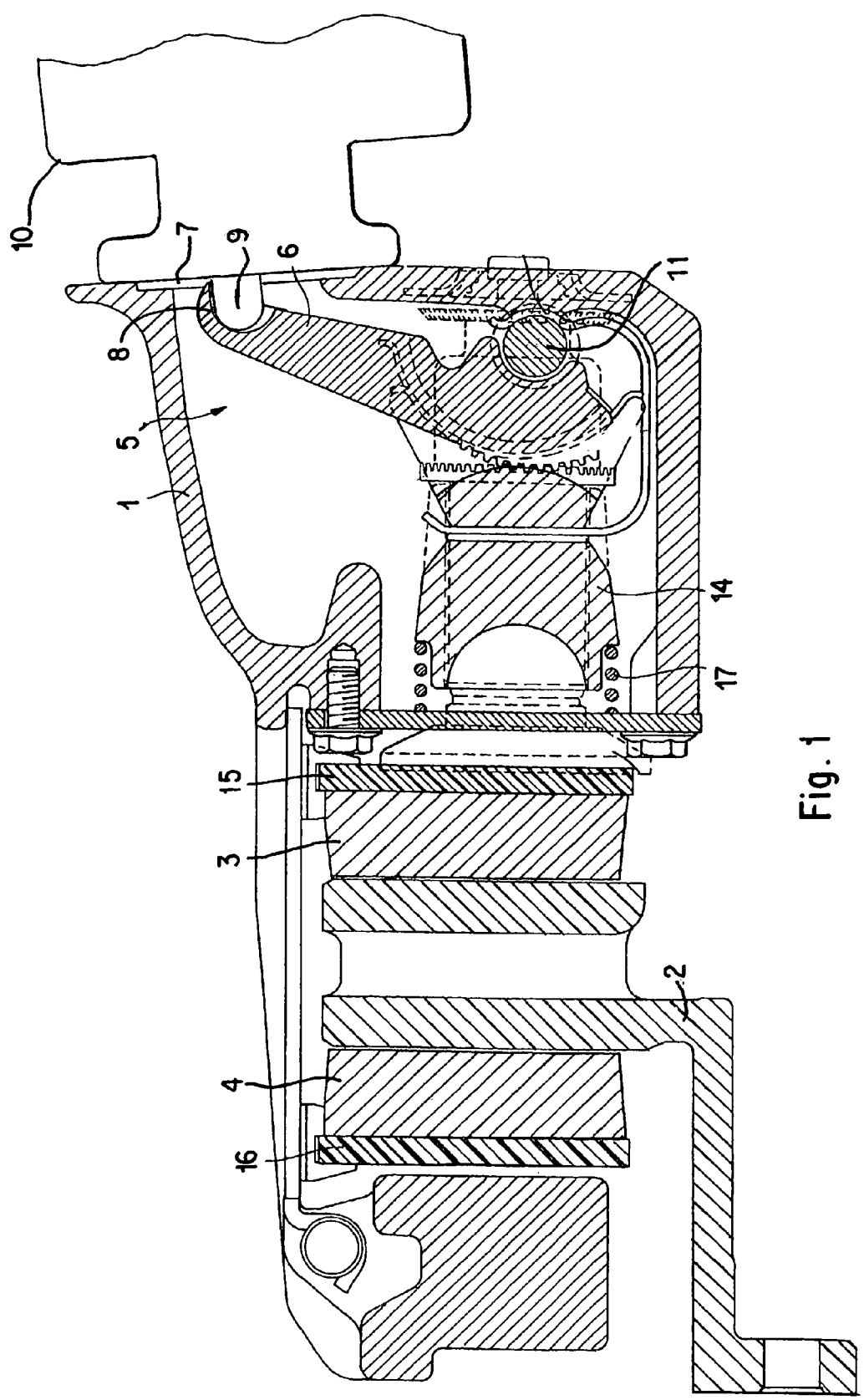
FIG. 1 is a longitudinal sectional view of an air-operated disc brake caliper actuated by an internal brake actuator mechanism.

FIG. 1 is a sectional view of an air-operated disc brake with a caliper 1 which straddles a brake disc 2 mounted on a vehicle axle hub (not illustrated). On both sides of the disc 2, brake linings or pads 3 and 4 are supported on the caliper 1. The caliper is supported by a caliper supporting bracket (not shown), and is displaceably guided on the bracket transversely with respect to the brake disc 2 such that, when the brake is operated (as described further below), the brake pads 3 and 4 press against the brake disc 2 to create a frictional drag which inhibits disc rotation.

A portion of the caliper housing 1 receives a brake application unit 5, which includes a rotary actuator lever 6. The rotary actuator lever 6 extends toward an opening 7 in the caliper housing. A recess 8 formed at the upper end of lever 6 receives an actuator rod 9 extending from a pneumatic brake cylinder 10 affixed to a rear face of the caliper housing 1. When the actuator rod 9 is advanced by the pneumatic brake cylinder 10 into the caliper housing 1, actuator lever 6 rotates about a longitudinal axis of supporting roller shaft 11, in a direction generally parallel to the axis of rotation of the brake disc. In this air disc brake, supporting roller shaft 11 is fixed to lever 6, such that when lever 6 is caused to rotate by actuator rod 9, roller shaft 11 rotates with lever 6. Of course, any alternative arrangement allowing the rotary lever to pivot, including a reverse arrangement of the lever's bearing face and the supporting roller, can be used within the spirit and scope of the invention.

Actuator lever 6 is formed with faces which are curved and offset with respect to the axis of rotation of the roller shaft 11, which move with an eccentric motion when the actuator rod 9 presses actuator lever 6 toward the brake disc 2. These eccentric faces press against a bridge element 14 in order to linearly advance (by a mechanism not needing explanation for purposes of describing the present invention) a pair of spindles, which in turn press against brake pad backing plate 15 (and via reaction forces, pad backing plate 16) in order to press pads 3 and 4 against disc 2. Conversely, when the pressure applied to brake pads 3, 4 is to be decreased, the actuator rod 9 withdraws into pneumatic brake cylinder 10, allowing a restoring spring 17 to press the bridge 14 in a direction away from disc 2 and, via the eccentric arrangements described above, thereby rotate lever 6 back toward pneumatic brake cylinder 10. The above is but one example of an actuator arrangement usable with the present invention. Of course, other actuator arrangements can also be used, such as those having a single spindle or those not using a bridge.

The air disc brake of FIG. 1 illustrates a typical air disc brake, in that actuator lever 6 and actuator rod 9 are completely enclosed in a sealed chamber formed by caliper housing 1 and pneumatic brake cylinder 10, without any readily accessed exterior indication of the amount of stroke of actuator rod 9. In particular, there is no indication when the brake of FIG. 1 is applied as to how much actuator rod 9 stroke remains available before reaching a stroke limit, i.e., an amount of actuator rod stroke at which safe braking operation can no longer be assured.

Figure 2:
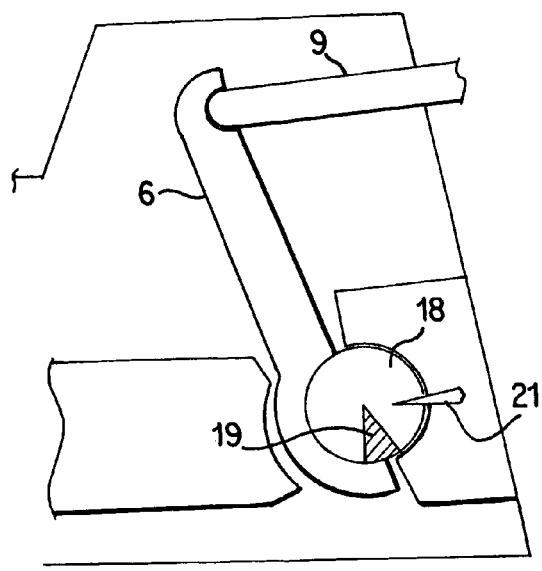
FIG. 2 is a schematic illustration of a side view of a mechanical actuator stroke indicator located within a brake disc caliper according to an embodiment of the invention.
Figure 3:
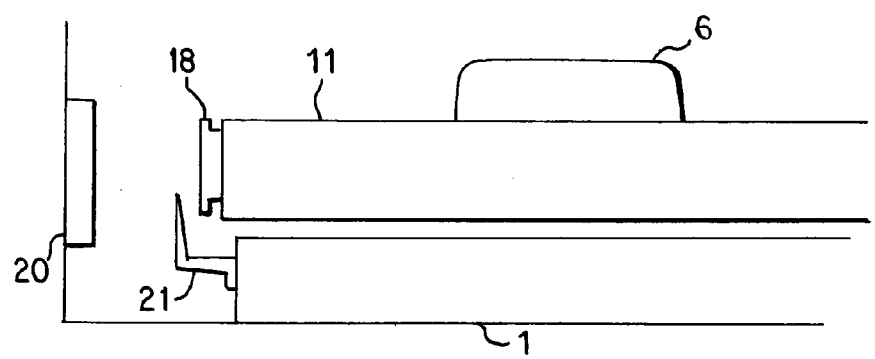
FIG. 3 is a schematic illustration of a top view of the mechanical actuator stroke indicator of FIG. 2.
Figure 4:
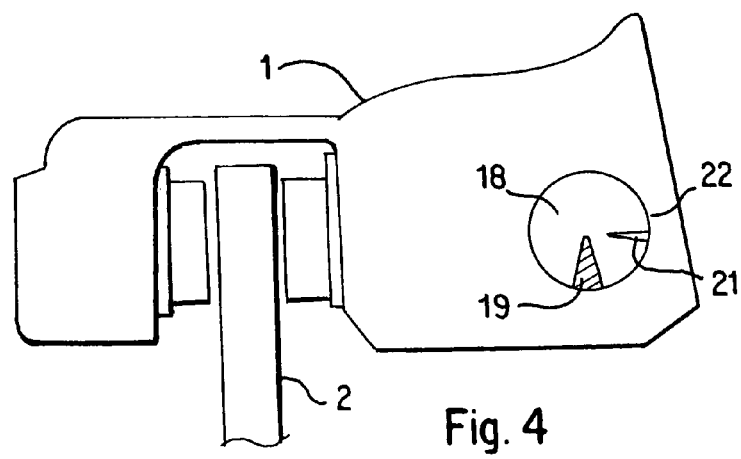
FIG. 4 is an end-view of brake disc caliper of FIG. 2 illustrating an inspection viewing port according to an embodiment of the invention.

FIGS. 2 and 3 schematically illustrate an embodiment of the present invention which may be employed on an air disc brake, including the brake illustrated in FIG. 1. In an air disc brake 1 in which the linear motion of an actuator rod is converted into a rotary motion in a fixed relationship of linear motion-to-rotary motion (as occurs in the FIG. 1, brake as actuator rod 9 causes lever 6 and its roller shaft 11 to rotate), a motion indicator or sensor may be coupled to the rotating element. The motion indicator or sensor may be observable through a port in the caliper housing or, alternatively, may be remotely readable (an example embodiment of a remotely-readable sensor is described further below). The motion indicator may be mechanically simple, such as an indicator disc 18 shown in FIG. 2 affixed to an end of roller shaft 11 and provided with calibrated markings 19 such as lines or colored ranges corresponding to "safe" and/or "unsafe" actuator stroke displacements, where the indicator disc 18 is visible through a viewing port 20 in the side of the caliper housing as shown in FIG. 3. Preferably, a reference indicator, such as needle 21, may be provided to assist in assessment of whether markings 19 have reached a point at which actuator stroke has become unacceptable. Desirably, a viewing port for inspecting indicator disc 18 may be provided by making use of an existing aperture in the caliper housing. For example, in the case of the caliper housing illustrated in FIG. 1, there is a port generally aligned with the longitudinal axis of roller shaft 11 which is employed during caliper manufacturing for machining internal caliper surfaces. The normally present closure plug for this aperture can simply be removed for inspection of indicator disc 18, or preferably, as shown in FIG. 4, may be replaced with a plug with a sight glass 22, thereby permitting rapid inspection of indicator disc 18, markings 19 and needle 21 without any brake caliper disassembly.

A wide variety of alternative mechanical internal stroke indication arrangements will be apparent to those of ordinary skill in the art. For example, rather than directly affixing indicator disc 18 to an end of roller shaft 11, the indication markings may be cast or painted on the end of the roller shaft, an indicator needle which points to a scale provided on the caliper housing may be affixed to the rotating element, or the indicator may be coupled with the rotary lever.

Alternatively, the rotary motion indicator may be disposed away from the axis of rotation of the element which rotates in response to the linear motion of the actuator rod, as long as the rotary motion indicator is coupled, for example by gearing, to rotate in a fixed relationship to the motion of the actuator rod, and the transferred indication remains externally readable by an inspector. Such offset alternative arrangements would be particularly suited to air disc brakes wherein internal brake actuator components, such as pad clearance adjustment mechanisms, are positioned such that they block a direct line of sight from an access port to the rotating axis of the actuator lever.

A further embodiment would extend transmission of the rotary motion indication directly to a port plug containing an indicator needle or rotary dial which can be directly observed, preferably on removal of a protective cover, without an inspector having to align their eye with a view port and peer into the caliper housing.

In other embodiments of the present invention, the mechanical rotary motion indicator of FIGS. 2 and 3 may be replaced by a sensor, such as a conventional rotary potentiometer or a magnetic or optical position sensor, where a signal generated by the sensor may be provided externally to the caliper. For example, a signal from such a remote sensor could be provided to appropriate electrical or optical conductors which sealably penetrate the caliper housing. These conductors could be located on the brake caliper itself or at a remote location, such as at an inspection panel located at an exterior surface of the vehicle, where they could be interrogated by a suitable inspection device, such as a hand-held electronic meter, during an inspection. Alternatively, the sensor signals could be provided to an external display or warning indicator, such as a display unit or warning indicator, provided at the vehicle operator's position. The signals could be provided via conductors to the operator's position, or alternatively may be transmitted wirelessly in a manner well known in the art from a transmitter at or near the caliper housing to a receiver at or near the operator's position. Moreover, the signal can be transmitted to the various control units now commonly used in vehicles to allow for automatic analysis and action deemed necessary and/or useful.

In another embodiment, local and remote stroke indicators may be combined to provide multiple stroke indications. For example, a local mechanical stroke indicator such as the foregoing indicator disk 18 may be employed with, or integrated onto, a remote sensor, such that separate, redundant local and remote indications of actuator stroke may be provided for the same pneumatically-operated disc brake on a vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A stroke indicator for indicating a stroke of a brake actuator of a disc brake, comprising:
   a stroke indicator, the stroke indicator being located within a caliper housing of the disc brake and coupled to the brake actuator to rotate in a predetermined manner in response to displacement of the brake actuator,
   wherein, when the disc brake is actuated, the brake actuator is displaced through said brake actuator stroke, and the stroke indicator member provides an indication discernable from outside of the caliper housing of an amount of brake actuator stroke remaining prior to reaching a predetermined brake actuator position.

2. The stroke indicator according to claim 1, wherein the brake actuator is a rod which is displaced linearly when the disc brake is actuated.

3. The stroke indicator according to claim 2, wherein the stroke indicator is coupled to the rod via a rotating lever which converts linear rod displacement to a corresponding stroke indicator rotational displacement.

4. The stroke indicator according to claim 1, wherein the indication of amount of brake actuator stroke remaining prior to reaching a predetermined brake actuator position is visible through a port in the caliper housing.

5. The stroke indicator according to claim 4, wherein the stroke indicator member is a mechanical indicator.

6. The stroke indicator according to claim 5, wherein the mechanical indicator is a rotary dial.

7. The stroke indicator according to claim 5, wherein the mechanical indicator is a rotary needle.

8. The stroke indicator according to claim 1, wherein the indication of the amount of brake actuator stroke remaining prior to reaching a predetermined brake actuator position is provided externally to the caliper housing.

9. The stroke indicator according to claim 8, wherein the external indication is provided at a location on a vehicle on which the disc brake is mounted remote from the caliper housing.

10. The stroke indicator according to claim 9, wherein the external indication of the amount of brake actuator stroke remaining prior to reaching a predetermined brake actuator position is displayed at a vehicle operator's position.

11. The stroke indicator according to claim 8, wherein the stroke indicator member is one of an electrical sensor, a magnetic sensor and an optical sensor, and a signal generated by the sensor indicative of the amount of brake actuator stroke remaining prior to reaching a predetermined brake actuator position is transmitted by at least one of a physical and a wireless signal conductor to a location outside the caliper housing.

12. The stroke indicator according to claim 11, wherein the signal indicative of the amount of brake actuator stroke remaining prior to reaching a predetermined brake actuator position is provided to an operator position of a vehicle on which the disc brake is mounted.

13. The stroke indicator according to claim 1, wherein the port is a machining port of the caliper.

14. A disk brake, comprising:
   a brake disc;
   a brake caliper housing
   a brake actuator disposed to actuate a brake application unit within the brake caliper housing to apply disc brake pads to the brake disc; and
   a stroke indicator member for indicating a stroke of the brake actuator, the stroke indicator member located within the brake caliper housing and coupled to the brake actuator to rotate in a predetermined manner in response to displacement of the brake actuator,
   wherein, when the disc brake is actuated, the brake actuator is displaced through said brake actuator stroke, and the stroke indicator member provides an indication discernable from outside of the caliper housing of an amount of brake actuator stroke remaining prior to reaching a predetermined brake actuator position.

15. The stroke indicator according to claim 14, wherein the brake actuator is a rod which is displaced linearly when the disc brake is actuated.

16. The stroke indicator according to claim 15, wherein stroke indicator member the stroke indicator member is coupled to the actuator rod via a rotating lever which converts linear actuator rod displacement to a corresponding stroke indicator member rotational displacement.

17. The stroke indicator according to claim 14, wherein the indication of amount of brake actuator stroke remaining prior to reaching a predetermined brake actuator position is visible through a port in the caliper housing.

18. The stroke indicator according to claim 17, wherein the stroke indicator member is a mechanical indicator.

19. The stroke indicator according to claim 18, wherein the mechanical indicator is a rotary dial.

20. The stroke indicator according to claim 18, wherein the mechanical indicator is a rotary needle.

21. The stroke indicator according to claim 14, wherein the indication of the amount of brake actuator stroke remaining prior to reaching a predetermined brake actuator position is provided externally to the caliper housing.

22. The stroke indicator according to claim 21, wherein the external indication is provided at a location on a vehicle on which the disc brake is mounted remote from the caliper housing.

23. The stroke indicator according to claim 22, wherein the external indication of the amount of brake actuator stroke remaining prior to reaching a predetermined brake actuator position is displayed at a vehicle operator's position.

24. The stroke indicator according to claim 21, wherein the stroke indicator member is one of an electrical sensor, a magnetic sensor and an optical sensor, and a signal generated by the sensor indicative of the amount of brake actuator stroke remaining prior to reaching a predetermined brake actuator position is transferred by at least one of a physical and a wireless signal conductor to a location outside the caliper housing.

25. The stroke indicator according to claim 24, wherein the signal indicative of the amount of brake actuator stroke remaining prior to reaching a predetermined brake actuator position is provided to an operator position of a vehicle on which the disc brake is mounted.

26. A method for indicating an amount of stroke remaining prior to reaching a predetermined position of a brake actuator of a disc brake, the method comprising the acts of:
   providing a stroke indicator, the stroke indicator being located within a caliper housing of the disc brake and coupled to the brake actuator to rotate in a predetermined manner in response to displacement of the brake actuator;
   actuating the disc brake, wherein when actuated, the brake actuator is displaced through said brake actuator stroke; and
   observing indication of an amount of brake actuator stroke remaining prior to reaching a predetermined brake actuator position provided by the stroke indicator member from outside of the caliper housing.

27. The method according to claim 26, wherein the indication of amount of brake actuator stroke remaining prior to reaching a predetermined brake actuator position is visible through a port in the caliper housing.

28. The method according to claim 26, wherein the indication of the amount of brake actuator stroke remaining prior to reaching a predetermined brake actuator position is provided externally to the caliper housing.

29. The method according to claim 28, further comprising the act of:
provising an operator-readable display of the indication of the amount of actuator stroke remaining prior to reaching a predetermined brake actuator position to an operator position of a vehicle on which the disc brake is mounted.

30. An axle assembly, comprising:
a vehicle axle having a rotating axle hub at an outboard end of the axle;
a brake disc disposed on the axle hub and arranged to rotate with the hub;
a brake caliper housing mounted on the vehicle axle and straddling the brake disc;
a brake actuator disposed to actuate a brake application unit within the brake caliper housing to apply disc brake pads to the brake disc; and
a stroke indicator member for indicating a stroke of the brake actuator, the stroke indicator member located within the brake caliper housing and coupled to the brake actuator to rotate in a predetermined manner in response to displacement of the brake actuator,
wherein, when the disc brake is actuated, the brake actuator is displaced through said brake actuator stroke, and the stroke indicator member provides an indication discernable from outside of the caliper housing of an amount of brake actuator stroke remaining prior to reaching a predetermined brake actuator position.

* * * * *